United States Patent [19]

Kawabe

[11] Patent Number: 5,012,990
[45] Date of Patent: May 7, 1991

[54] SPINNING REEL
[75] Inventor: Yozo Kawabe, Osaka, Japan
[73] Assignee: Shimano Industrial Co., Ltd., Osaka, Japan
[21] Appl. No.: 402,697
[22] Filed: Sep. 1, 1989
[30] Foreign Application Priority Data
   Sep. 5, 1988 [JP] Japan .................. 63-116556[U]
[51] Int. Cl.⁵ ............................................. A01K 89/01
[52] U.S. Cl. ................................................... 242/242
[58] Field of Search .............................. 242/242, 241
[56] References Cited
   U.S. PATENT DOCUMENTS
   4,618,107 10/1986 Nakajima ........................... 242/241
   4,865,262 9/1989 Tsunoda ............................. 242/241
   FOREIGN PATENT DOCUMENTS
   603605 6/1948 United Kingdom ................ 242/241

Primary Examiner—Katherine Matecki
Attorney, Agent, or Firm—Edwin E. Greigg; Ronald E. Greigg

[57] ABSTRACT

A spinning reel has a reel body, a handle shaft rotatably supported to the reel body, a spool shaft supported to the reel body to be axially slidable thereto and for supporting a spool, a rotary frame rotatable with a rotation of the handle shaft thereby to wind up a fishing line about an outer periphery of the spool and a slide mechanism for causing the spool shaft to slide with a rotation of the handle shaft. The slide mechanism includes a slide element gear rotatable with the rotation of the handle shaft, the slide element gear having a pivot shaft positioned on a side of the rotary frame across the handle shaft, a portion of the gear element being included within the rotary frame, a slide element slidable back and forth along a guide portion to slide the spool shaft in reciprocating motion, and a cam mechanism for transducing the rotary motion of the slide element gear into the reciprocating motion of the slide element.

7 Claims, 4 Drawing Sheets

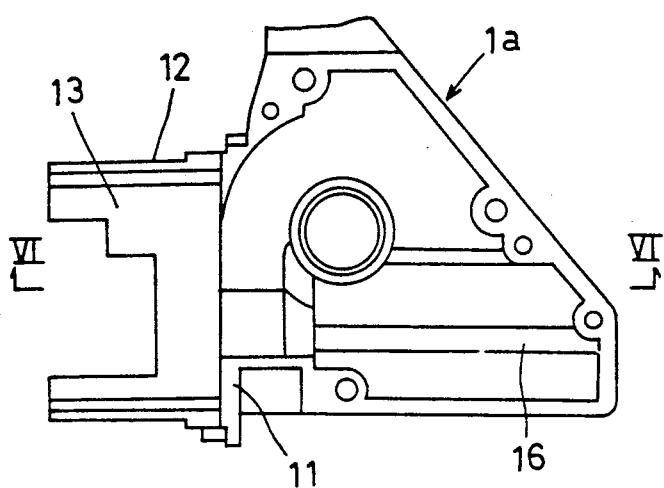
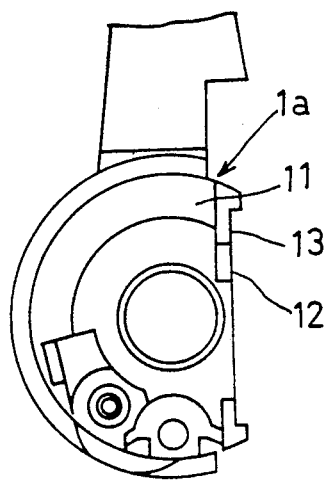
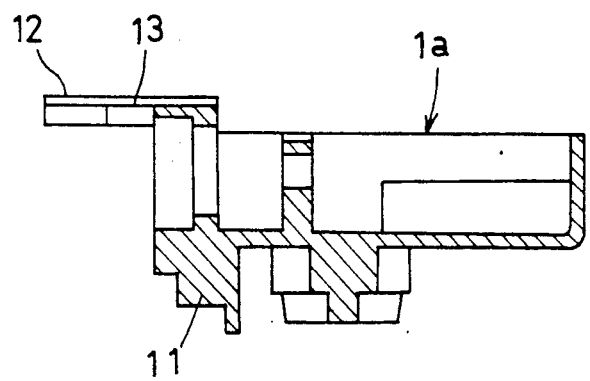
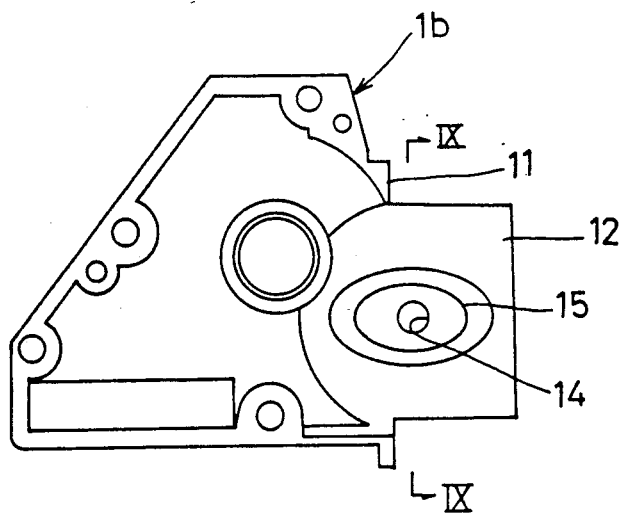
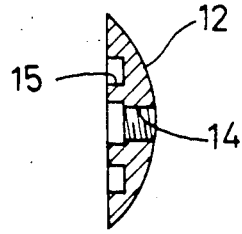

SPINNING REEL

BACKGROUND OF THE INVENTION

1. Field of the Invention

The present invention relates to a spinning reel, and more particularly to a spinning reel including a reel body, a handle shaft rotatably supported to the reel body, a spool shaft supported to the reel body to be axially slidable thereto and for supporting a spool, a rotary frame rotatable with a rotation of the handle shaft thereby to wind up a line about an outer periphery of the spool and a slide mechanism for causing the spool shaft to slide with a rotation of the handle shaft.

2. Description of the Prior Art

In a spinning reel of the above-noted type, there are known various kinds of slide mechanisms for causing the slide motion of the spool shaft. The constructions of these conventional mechanisms will be described next.

In one known construction disclosed in e.g. a Japanese published utility model Showa: 60-26626. The construction essentially comprises a rigid transverse shaft defining a spiral groove in its outer periphery and an engaging member engageable with the spiral groove.

In another known construction disclosed in e.g. a Japanese published patent Showa: 59-196026, the construction essentially comprises a slide element gear rotatable with a rotation of a handle shaft and having a pivot shaft positioned on the opposite side across the handle shaft to a rotary frame, a slide element slidable back and forth along a guide portion attached to the reel body so as to cause a spool shaft to slide in reciprocating motion and a cam mechanism for transducing the rotary motion of the slide element gear into the reciprocating motion of the slide element.

The first-noted conventional construction has a cost disadvantage. That is, it is very difficult to cut the spiral groove in the outer periphery of the rigid transverse shaft and the manufacturing cost of the spinning reel tends to be very high because of this difficulty.

On the other hand, the second-noted conventional construction has a space disadvantage. That is, in this construction, the slide element gear, which occupies considerably large space, is positioned on the opposite side across the handle shaft to the rotary frame. Accordingly, in comparison with the above first construction, the reel body tends to have a considerably large externally exposed portion, thereby imposing inconvenience in the handling of the spinning reel.

In view of the above-described state of the art, the primary object of the present invention is to provide a spinning reel which can be manufactured at low cost and which is formed compactly as a whole for easy handling.

SUMMARY OF THE INVENTION

In order to accomplish the above-noted object, a spinning reel according to the invention comprises: a reel body; a handle shaft rotatably supported to the reel body; a spool shaft supported to the reel body to be axially slidable thereto and for supporting a spool; a rotary frame rotatable with a rotation of the handle shaft thereby to wind up a line about an outer periphery of the spool cylinder; and a slide mechanism for causing the spool shaft to slide with a rotation of the handle shaft; wherein the slide mechanism includes a slide element gear rotatable with the rotation of the handle shaft, the slide element gear having a pivot shaft positioned on a side of the rotary frame across from the handle shaft, a portion of the gear element being included within the rotary frame, a slide element slidable back and forth along a guide portion to slide the spool shaft in reciprocating motion, and a cam mechanism for transmitting the rotary motion of the slide element gear into the reciprocating motion of the slide element.

With the above characterizing features of the invention, the slide element gear has its pivot shaft positioned closer to the rotary frame than to the handle shaft and also a portion of this gear element is included within the rotary frame. Accordingly, the rotary frame can accommodate most of the physically large slide element gear. This rotary frame originally needs to have a large diameter in order to obtain a high line-winding efficiency, such that the accommodation of the slide element gear therein results in little enlargement of the rotary frame per se. As a result, the reel body and consequently the entire spinning wheel can be formed compactly. In addition, the cam mechanism using the slide element gear can be manufactured at a significantly lower cost by e.g. an injection molding of a synthetic resin material.

In short, the present invention has achieved the intended object of providing a spinning reel which can be manufactured at low costs and which is formed compactly as a whole for easy handling.

According to one preferred embodiment of the invention, the guide portion projects into the large interior of the rotary frame, such that the rotary frame provides the large space required for permitting the operational stroke of the slide element. Thus, this feature is advantageous for forming the reel body even more compactly.

Further and other objects, features and effects of the invention will become apparent from the following more detailed description of the embodiments of the invention with reference to the accompanying drawings.

BRIEF DESCRIPTION OF THE DRAWINGS

Accompanying drawings FIGS. 1 through 10 illustrate one preferred embodiment of the present invention; in which, FIG. 1 is a vertical section view of the major portions of a spinning reel of the invention, FIG. 2 is a section taken along a line II—II of FIG. 1, FIG. 3 is a section taken along a line III—III of FIG. 1, FIG. 4 is a section taken along a line IV—IV of FIG. 1, FIG. 5 is a side view showing a main reel body, FIG. 6 is a section taken along a line VI—VI of FIG. 5, FIG. 7 is a front view of the main reel body shown in FIG. 5, FIG. 8 is a side view of a reel body lid, FIG. 9 is a section taken along a line IX—IX of FIG. 8, and FIG. 10 is a view showing the entire spinning reel.

DESCRIPTION OF THE PREFERRED EMBODIMENTS

Preferred embodiments of the present invention will be particularly described hereinafter with reference to the accompanying drawings. In these embodiments, a spinning reel, to which the present invention relates, is embodied as one for fishing use.

Figure 1:
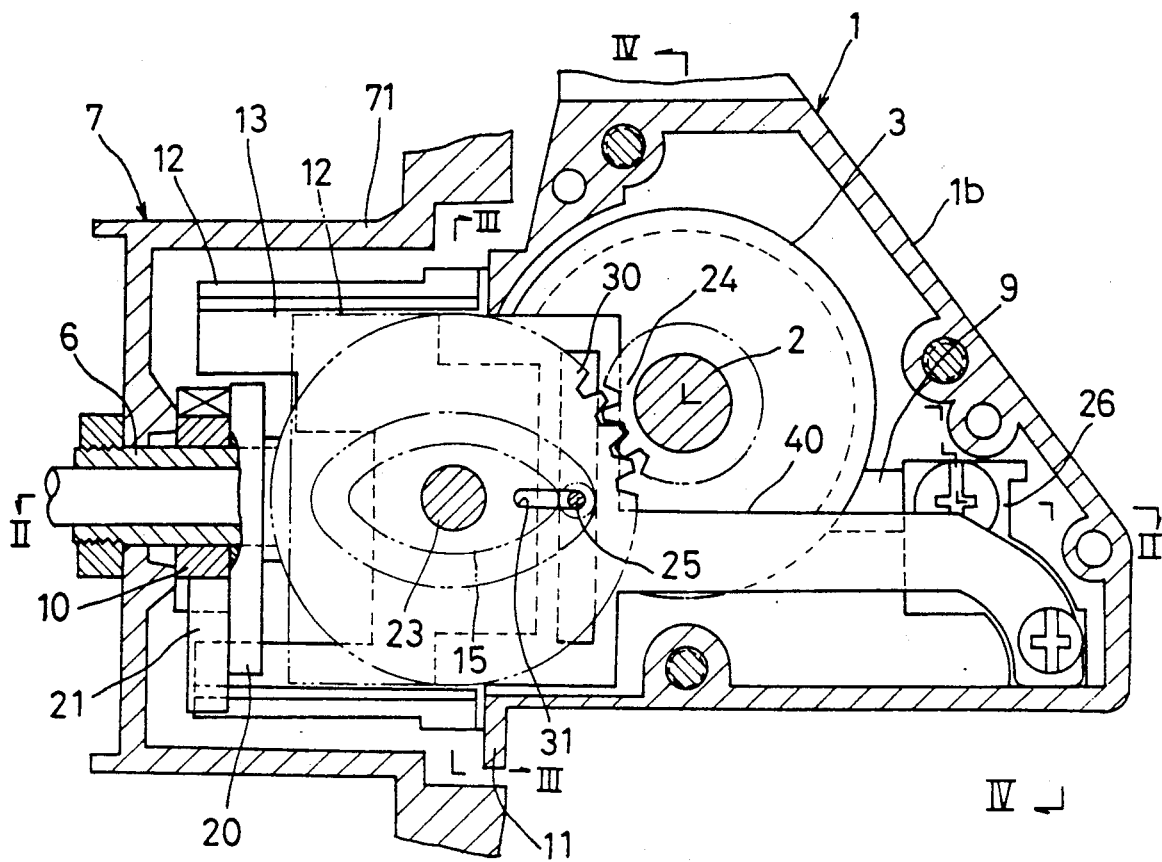

A reel body 1 shown in FIG. 1 includes a main reel body 1a having one opened lateral side and a reel body lid 1b for covering and closing the opened side of the main reel body 1a. The main reel body 1a and the reel body lid 1b are detachably connected to each other by means of a plurality of screws to form one integral enclosed construction. The reel body 1 further includes an extension 12 which projects into the interior of a rotary frame 7 when the body 1 and the frame 7 are attached to each other and a flange 11 disposed between an externally exposed portion and the extension 12 of the reel body 1.

As illustrated in FIGS. 1 through 4, the reel body 1 rotatably supports a handle shaft 2 via a pair of bearings attached respectively to the main reel body 1a and the reel body lid 1b. This handle shaft 2 fixedly carries a handle 4, shown in FIG. 10, at a portion of the shaft 2 projecting externally from the reel body 1. Further, the handle shaft 2 carries a master gear 3 at a portion of the shaft 2 projecting into the interior of the reel body 1. This master gear 3 has a disc-shaped gear body defining a plurality of teeth in one lateral side of its outer periphery. On the other hand, the main reel body 1a defines, at its portion attached to the flange 11, a through hole for rotatably supporting a hollow drive shaft 6 via a bearing. The drive shaft 6 mounts a pinion gear 5 engageable with the master gear 3, such that the drive shaft 6 is rotatably driven with a manual rotation of the handle 4.

Figure 10:
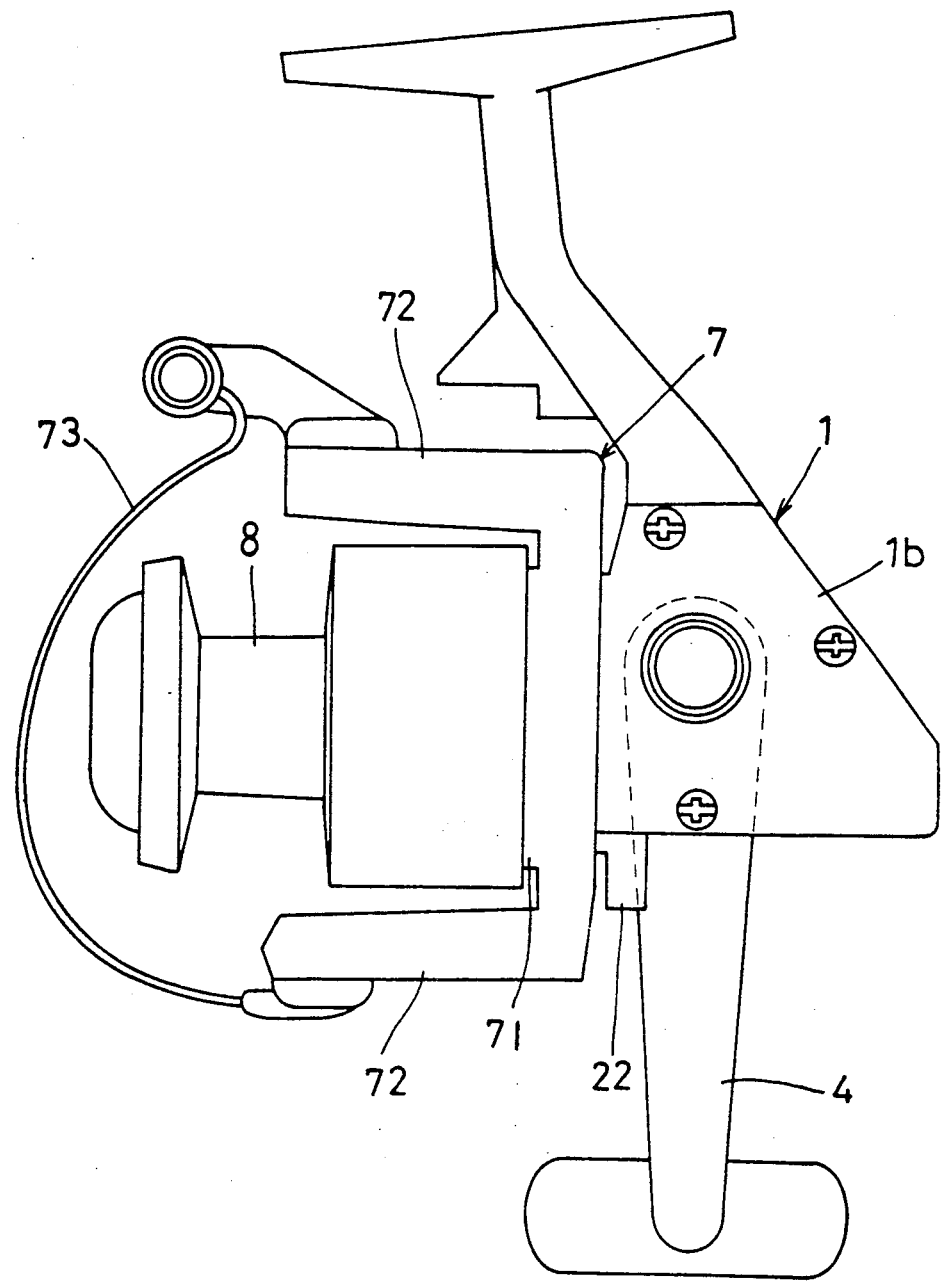

As shown in FIG. 10, on the leading end of the drive shaft 6, there is fitted the rotary frame 7 having a cylindrical portion 71 and a pair of support arms 72 and 72. On the other hand, as shown in FIG. 1, the hollow drive shaft 6 loosely supports in the axial hole thereof a spool shaft 9 carrying a spool 8, with the spool shaft 9 being axially movable back and forth relative to the drive shaft 6. Then, in operation, a rotational operation of the handle 4 drives the drive shaft 6 thereby to rotate the rotary frame 7 and at the same time the rotational handle operation causes the spool shaft 9 to move back and forth through a slide mechanism which will be described later. As a result, a fishing line is guided onto the spool 8 via a bail arm 73 supported between the support arms 72 and 72 of the rotary frame 7 and the line is wound up on the spool 8.

The above-mentioned slide mechanism, as shown in FIGS. 1 through 4, includes a slide element gear 30, a slide element 40 and a cam mechanism.

The slide element 40 is supported by a guide 13 attached to the main reel body 1a to be slidable back and forth. The guide 13 is formed on a side face of the plate-shaped extension 12 projecting from the flange 11 of the main reel body 1a and includes a flat face flush with the side face of the extension 12 and raised faces raised respectively from the upper and lower edges of the flat face. The slide element 40 consists essentially of an approximate letter 'T'-shaped plate member having a wide portion and a narrow portion, which plate member is formed by punching of an iron plate. The wide portion is placed in abutment against the guide 13 and defines a vertically elongated second slot 41, whereas the narrow portion extends along the spool shaft 9 toward a rear side of the reel body 1.

The slide element gear 30 includes a pivot shaft 23 disposed on the side of the rotary frame 7 across from the handle shaft 2 and the gear 30 is disposed closely between the sliding element 40 and the reel body 1.

More particularly, an inner side face of the extension 12 of the reel body lid 1b is formed flat and defines a screw hole 14 engageable with the pivot shaft 23 which rotatably supports the slide element gear 30. Further, this slide element gear 30 is engaged with a small reducing gear 24 fitted on the handle shaft 2 such that the gear 30 can rotate in unison with the handle shaft 2 in a reduced rotational speed. Incidentally, the pivot shaft 23 of the slide element gear 30 is disposed in parallel with the handle shaft 2.

The cam mechanism includes a loop-shaped cam 15 (FIG. 8) attached to the reel body 1, a first elongated slot 31 defined in the slide element gear 30, the second elongated slot 41 defined in the slide element 40 and a pin 25 acting as a cam follower slidable in the loop-shaped cam 15, the first elongated slot 31 and in the second elongated slot 41. More specifically, the loop-shaped cam 15 essentially comprises an annular oval slot defined in the flat face of the extension 12 of the reel body lid 1b. The first elongated slot 31 extends radially in the slide element gear 30, whereas the second elongated slot 41 extends normal to the sliding direction of the slide element 40. In operation, with a rotation of the slide element gear 30, the pin 25 moves along the loop-shaped cam 15 thereby to reciprocate the slide element 40 back and forth along the guide 13. Incidentally, the oval configuration of the loop-shaped cam 15 is so adapted that the rotational motion of the slide element gear 30 by a constant angular velocity can be transduced into the linear reciprocating motion of the slide element 40 of a constant speed.

Figure 2:
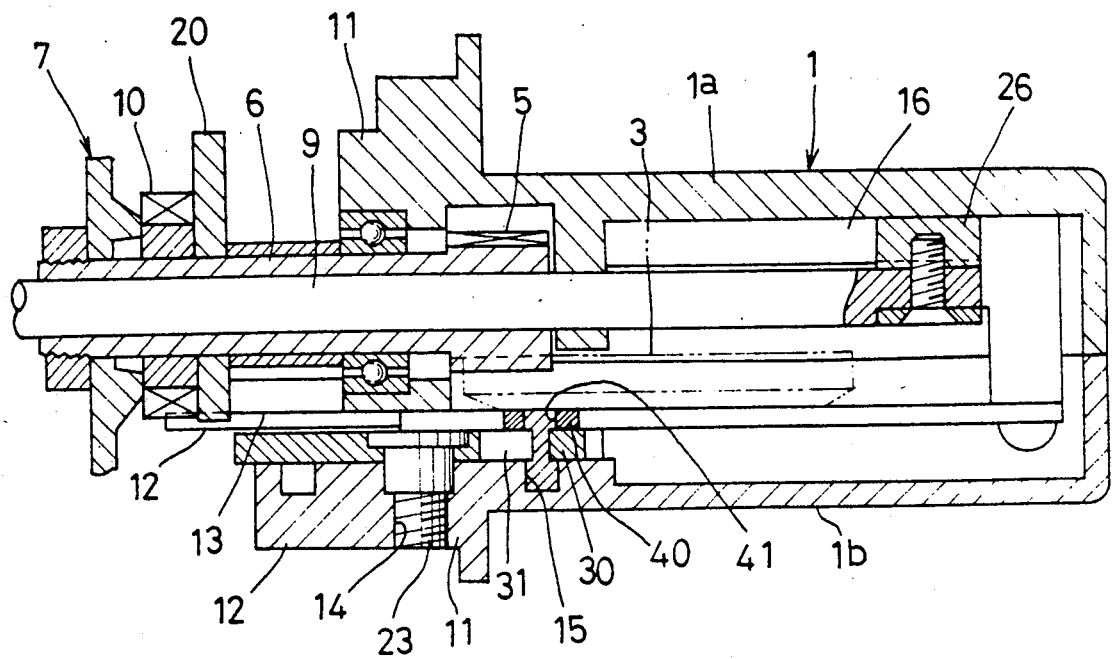
Figure 3:
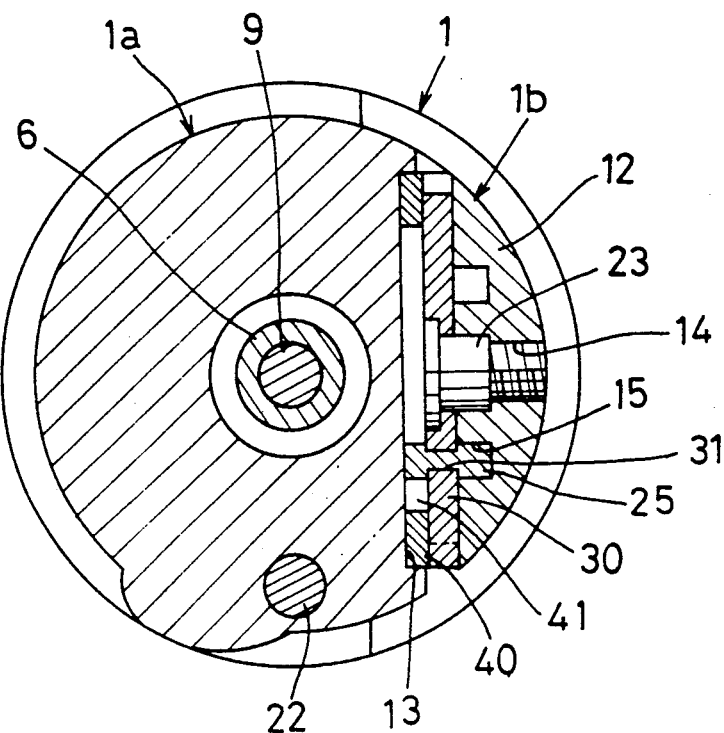
Figure 4:
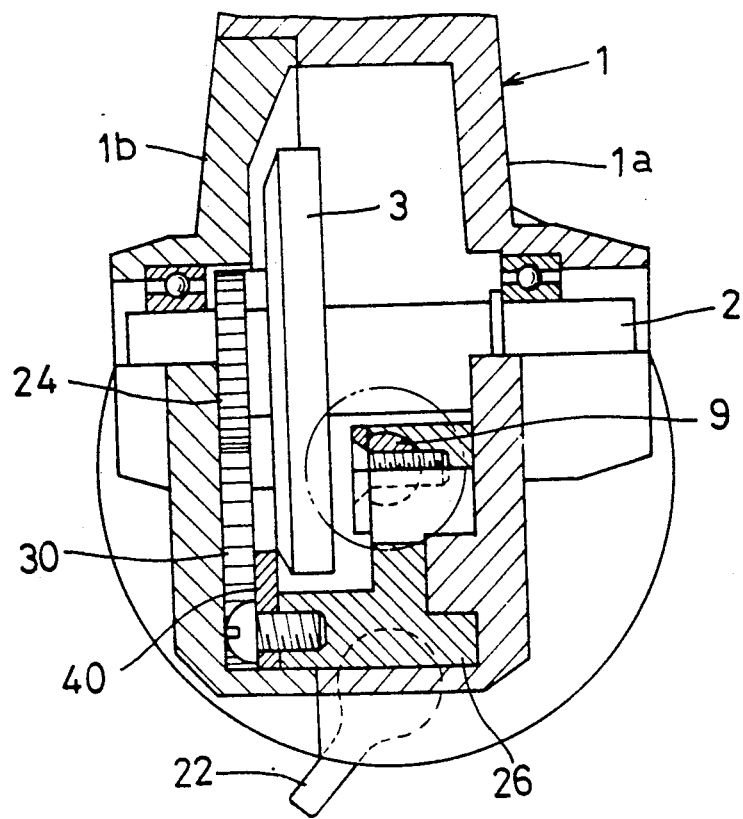

Referring to FIG. 4, the rear end of the slide element 40 is connected with a rear end of the spool shaft 9 via a connecting element 26, such that the spool shaft 9 can reciprocate in unison with the slide element 40. As shown in FIG. 2, the inner face of the main reel body 1a includes a guide projection 16 for guiding the back-and-forth movement of the connecting element 26. Further, the connecting element 26 has its lower end face placed in abutment against inner bottom faces of the main reel body 1a and the reed body lid 1b so as not to be rotated relative thereto.

As shown in FIGS. 1 and 2, the drive shaft 6 carries thereon, between its support positions for the main reel body 1a and the rotary frame 7, an anti-reverse gear 10 and a silent cam 20. Further, the flange 11 pivotably supports an anti-reverse claw 21 engageable with the anti-reverse gear 10 for preventing a reverse rotation of the rotary frame 7 and an operational element 21 for operating the claw 21. The silent cam 20 serves to silence an engaging noise generated when the rotary frame 7 is rotated in the forward direction in the anti-reverse condition provided by the engagement between the anti-reverse claw 21 and the anti-reverse gear 10. This silent cam 20 has a disc-like shape and includes in its outer periphery an engagement-permitting portion for permiting the engagement between the claw 21 and the gear 10 and an engagement-preventing portion for preventing the engagement. Incidentally, the extension 12 of the main reel body 1a axially extends to the position of the anti-reverse gear 10 and defines, at its vertically intermediate portion, a recess for preventing an interference between the anti-reverse gear 10 and the silent cam 20.

Next, operations of the spinning reel having the above-described construction will be described.

When the handle 4 is rotated by a manual operation to wind up a fishing line on the spool 8, this rotational drive is transmitted via the handle shaft 2, the master gear 3, the pinion gear 5 and the drive shaft 6 to the rotary frame 7 to rotate this rotary frame. Then, this rotation of the rotary frame 7 causes the bail arm 73 to guide the fishing line onto the small-radius, i.e. line-winding portion of the spool 8. At the same time, the above rotational drive from the handle 4 is transmitted also to the slide element gear 30 via the reducing gear 24, such that the slide element gear 30 is rotated to cause the pin 25 to move along the loop-shaped cam 15 and further the slide element 40 engaged with the pin 25 is moved back and forth along the guide 13. Then, this back-and-forth movement of the slide element 40 causes the spool shaft 9 having the spool 8 to reciprocate back and forth. Thus, with this reciprocating motion of the spool 8 and with the above-described rotational movement of the rotary frame 7, the fishing line can be wound up in a regular and controlled manner over the entire outer periphery of the small-radius portion of the spool 8.

The slide element gear 30 can be formed easily by e.g. an injection molding of a synthetic resin material. Simiarly, the loop-shaped cam 15 can be defined easily if the reel body lid 1d is molded from a resin material. Therefore, the spinning reel of the present invention can be manufactured at much lower costs than the conventional reel using a rigid traverse shaft defining a spiral groove in its outer peripheral face.

Further, with the above-described construction of the invention, the rotary frame 7 can accommodate most of the physically large slide element gear 30. This rotary frame 7 originally needs to have a large diameter, such that the accommodation of the slide element gear 30 therein results in little enlargement of the rotary frame 7 per se. As a result, the reel body 1 and consequently the entire spinning wheel can be formed compactly.

Moreover, the guide portion 13 projects into the large interior of the rotary frame 7, such that the rotary frame 7 provides the large space required for permitting the operational stroke of the slide element 40. Thus, in comparison with the conventional construction where the reel body 1 accommodates the slide element gear 30 and the guide portion 13, the above-described feature of the invention makes it possible to reduce the longitudinal dimension of the reel body 1 from its flange 11 to the rear end. As a result, the reel body 1 and the entire spinning reel can be formed even more compactly.

Further, since the pair of guide portions 13 are disposed with a good distance therebetween in the spacious interior of the rotary frame 7, disadvantageous displacement of the slide element 40 relative to the guides 13 can be effectively avoided, such that the cam mechanism can provide a good transmission efficiency.

ALTERNATE EMBODIMENTS

Some alternate embodiments of the invention will be specifically described next.

(I) In the above embodiment, the reel body 1 includes the main reel body 1a and the reel body lid 1b while the body 1a and the lid 1b together include the extension 12. Instead, the extension 12 may be provided to only one of the body 1a and the lid 1b.

(II) The reducing gear 24 can be attached to the master gear 3.

(III) The cam mechanism can eliminate the loop-shaped cam 15 and can be formed by fixedly attaching the pin 25 to the slide element gear 30.

(IV) In the foregoing embodiment, the guide 13 is disposed inside the rotary frame 7 and the wide portion of the slide element 40 is supported inside the rotary frame 7. Alternately, the guide 13 may be disposed at the rear side of the flange 11 such that the narrow portion of the slide element 40 can be supported inside the reel body 1.

(V) In the foregoing embodiment, the slide element gear 30 is disposed closely between the slide element 40 and the reel body lid 1b. Instead, the slide element 40 can be disposed closely between the slide element gear 30 and the reel body lid 1b.

(VI) The second elongated slot 41 can be substituted by an elongated groove with a bottom.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A spinning reel comprising:
    a reel body;
    a handle shaft rotatably supported to said reel body;
    a spool;
    a spool shaft for supporting said spool to said reel body, said spool shaft being axially slidable relative to said reel body;
    a rotary frame constructed as a hollow structure and rotatably supported to said reel body; said reel frame being rotatable by said handle shaft through a rotary transmission mechanism to wind up a line about a periphery of said spool;
    a slide element slidable back and forth attached to said spool shaft and being in said reel body for sliding said spool shaft;
    at least one guide portion on said reel body engaging said slide element for guiding the slide element back and forth in said reel body;
    a slide element gear rotatably supported to said reel body on a pivot shaft mounted on said reel body and extending substantially normal to said spool shaft; said slide element gear meshing with a gear which is mounted for rotation with said handle shaft; a cam mechanism having a loop-shaped cam attached to said reel body, an elongated slot defined in said slide element gear and a cam follower slidable in said loop-shaped cam and said elongated slot, said cam follower engaging said slide element for transducing rotary movement of said slide element gear into sliding movement of said slide element;
    said pivot shaft being positioned on the side of said rotary frame across from said handle shaft; and
    a portion of said slide element gear being caused to extend into said hollow structure of the rotary frame.

2. A spinning reel as set forth in claim 1, wherein said at least one guide portion has a part thereof extending into said hollow structure of the rotary frame and is positioned adjacent said slide element gear.

3. A spinning reel as set forth in claim 2, wherein two guide portions are separately provided and spaced apart in a direction normal to the sliding direction of said slide element.

4. A spinning reel as set forth in claim 3, wherein said slide element comprises a second elongated slot extending in a direction intersecting the sliding direction of said slide element, said cam follower engaging said slot.

5. A spinning reel as set forth in claim 4, wherein said slide element comprises sliding contact portion where said slide element comes into sliding contact with said guide portion, the sliding contact portion extending farther towards the front side of said reel than a portion of said slide element where said second elongated slot is located.

6. A spinning reel as set forth in claim 5, wherein said slide element gear is disposed between said slide element and said reel body.

7. A spinning reel as set forth in claim 5, wherein an anti-reverse gear is disposed in a recess formed between said guide portions and a further recess formed between the sliding contact portions of said slide element.

* * * * *